United States Patent
Bancon et al.

(10) Patent No.: US 7,309,378 B2
(45) Date of Patent: Dec. 18, 2007

(54) SYNGAS PURIFICATION PROCESS

(75) Inventors: Stephane Bancon, Artix (FR); Remi Le Bec, Labastide Cezeracq (FR)

(73) Assignee: Arkema France, Colombes, Cedex (FR)

( * ) Notice: Subject to any disclaimer, the term of this patent is extended or adjusted under 35 U.S.C. 154(b) by 160 days.

(21) Appl. No.: 11/336,992

(22) Filed: Jan. 23, 2006

(65) Prior Publication Data

US 2006/0117952 A1    Jun. 8, 2006

Related U.S. Application Data

(63) Continuation of application No. 10/293,938, filed on Nov. 14, 2002, now abandoned.

(30) Foreign Application Priority Data

Nov. 14, 2001  (FR) .................................. 01 14710

(51) Int. Cl.
  *B01D 53/04* (2006.01)
  *B01D 53/047* (2006.01)
(52) U.S. Cl. ............................. 95/96; 95/117; 95/129; 95/139; 95/143; 95/902
(58) Field of Classification Search ............ 95/96–106, 95/117–120, 129, 139, 143, 902; 96/132, 96/153
  See application file for complete search history.

(56) References Cited

U.S. PATENT DOCUMENTS

| | | | |
|---|---|---|---|
| 3,839,847 A | 10/1974 | Banikiotes et al. | |
| 4,775,396 A | 10/1988 | Rastelli et al. | |
| 4,859,217 A | 8/1989 | Chao | |
| 5,529,610 A | 6/1996 | Watson et al. | |
| 5,531,808 A | 7/1996 | Ojo et al. | |
| 5,914,455 A | 6/1999 | Jain et al. | |
| 6,048,509 A | 4/2000 | Kawai et al. | |
| 6,261,344 B1 * | 7/2001 | Labasque et al. ............... | 95/96 |
| 6,270,557 B1 | 8/2001 | Millet et al. | |
| 6,273,939 B1 | 8/2001 | Millet et al. | |
| 6,391,092 B1 | 5/2002 | Shen et al. | |
| 6,402,813 B2 * | 6/2002 | Monereau et al. ............. | 95/96 |
| 6,409,800 B1 | 6/2002 | Ojo et al. | |
| 6,454,838 B1 | 9/2002 | Xu et al. | |
| 6,464,756 B1 | 10/2002 | Plee | |
| 6,514,317 B2 | 2/2003 | Hirano et al. | |
| 6,530,975 B2 | 3/2003 | Rode et al. | |
| 6,537,348 B1 | 3/2003 | Hirano et al. | |
| 6,849,106 B2 * | 2/2005 | Le Bec .......................... | 95/97 |

FOREIGN PATENT DOCUMENTS

| | | |
|---|---|---|
| EP | 0718024 | 6/1996 |
| EP | 0862936 | 9/1998 |
| EP | 0862938 | 9/1998 |
| EP | 0904825 | 3/1999 |
| EP | 1101521 | 5/2001 |
| WO | WO 01/24923 | 4/2001 |

* cited by examiner

*Primary Examiner*—Frank M. Lawrence
(74) *Attorney, Agent, or Firm*—Millen, White, Zelano & Branigan, P.C.

(57) ABSTRACT

The present invention relates to a process for purifying a syngas of the $CO/H_2$ or $N_2/H_2$ type, which consists in removing $CO_2$ and possibly other gaseous impurities (water, etc.) before the gas undergoes a cryogenic process. These impurities are adsorbed by the gas stream to be purified passing over an NaLSX-type zeolite and then desorbed during a regeneration step which may be performed by raising the temperature (TSA) and/or reducing the pressure (PSA or VSA).

63 Claims, No Drawings

SYNGAS PURIFICATION PROCESS

This application is a continuation of U.S. patent application Ser. No. 10/293,938, filed Nov. 14, 2002, now abandoned.

TECHNICAL FIELD

The present invention relates to a process for purifying syngas of the $H_2/CO$ or $H_2/N_2$ type, which consists in removing $CO_2$ and possibly other gaseous impurities (water, methane, ethane, NOx, etc.) by adsorption over at least one bed of adsorbent(s) comprising at least one adsorbent based on an NaLSX-type zeolite.

The impurities are adsorbed by passing the gas stream to be purified over the bed(s) of adsorbent(s) comprising at least one adsorbent based on an NaLSX-type zeolite, and then they are desorbed during a regeneration step which may be performed by raising the temperature (TSA) and/or by reducing the pressure (PSA or VSA).

Advantageously, this process may be carried out before the syngas thus purified undergoes a cryogenic process to separate the hydrogen from the CO and the nitrogen.

PRIOR ART

The generic name syngas is used for gases predominantly consisting of hydrogen and CO (approximately 25% by volume of CO) which are used as reaction products in certain basic chemical syntheses (methanol, acetic acid, phosgene, acrylics, etc.). These syngases are generally obtained by partial oxidation or steam- or $CO_2$-reforming reactions on a hydrocarbon charge (ranging from natural gas up to heavy hydrocarbons), which gives a mixture consisting of $H_2+CO+CO_2+H_2O+$ other impurities, the respective proportions of $H_2$, CO, $CO_2$ and $H_2O$ depending on the synthesis conditions.

The term "syngases" also means, within the context of the present invention, $H_2/N_2$ mixtures used especially for the synthesis of ammonia. These mixtures are generally produced by the partial oxidation of air or by the reforming of a hydrocarbon charge. This step may be supplemented with the reaction called "CO-shift", namely $CO+H_2O \rightarrow CO_2+H_2$, which converts the CO to $CO_2$ and thus delivers more hydrogen.

It is often necessary to purify syngases, for example when it is desired to separate either CO and $H_2$, or $N_2$ and $H_2$, this being done either cryogenically or by washing with liquefied methane: it is absolutely necessary to remove all the impurities that could crystallize and therefore block the exchangers of the cryogenic process.

If the amount of $CO_2$ contained in the stream of syngas to be purified is greater than several thousands of ppm, it is firstly washed with amines (MEA or MDEA type) to remove most of the $CO_2$. The gas is then sent to a column of adsorbent(s) to remove the residual traces of $CO_2$ (a few tens of ppm) not removed by the washing with amines and possibly the other impurity or impurities present in the syngas, for example water that is often present at the same time as $CO_2$ (after washing with the amines, the gas is saturated with water).

Processes for purifying syngases by adsorption conventionally use, in the case of $CO_2$ adsorption, adsorbents based on a zeolite of the 4A (NaA) type or 13X type (NaX with an Si/Al atomic ratio $\geq 1.25 \pm 0.05$); however, these adsorbents share the drawback of giving relatively short adsorption/desorption cycle times, which requires the adsorbent material to be regenerated quite frequently and increases the operating cost of the industrial adsorption unit.

The use of zeolites of the LSX (low-silica X zeolite, i.e. with an Si/Al atomic ratio $\approx 1$), it not mattering whether these are exchanged with cations of Groups 1A, 2A, 3A, 3B and/or of lanthanides, etc., was disclosed in U.S. Pat. No. 5,531,808 and its corresponding EP 718 024 for decarbonizing gases less polar than $CO_2$, and especially air. According to U.S. Pat. No. 5,531,808 and EP 718 024, this process operates effectively only at adsorption pressures generally between 0.02 and 2 MPa.

SUMMARY OF THE INVENTION

The process according to the invention employs a bed of adsorbent(s) comprising an adsorbent based on a zeolite of NaLSX type, with Si/Al ranging from 0.9 to 1.1 and preferably ranging from 1 to 1.05, which proves to be particularly advantageous, compared with beds of adsorbents based on 4A or NaX zeolites, since it allows longer cycle times and therefore less frequent regenerations.

Within the context of the invention, the expression "adsorbent based on NaLSX" is understood to mean adsorbents whose zeolitic active material essentially consists of NaLSX zeolite but also mixtures of NaLSX zeolite and NaX zeolite, as described in detail in WO 01/24923 in the name of the Applicant.

The adsorbent based on NaLSX zeolite of the process according to the invention may be employed in powder form (in which form the NaLSX zeolite is in general synthesized) or, preferably, in the form of particles, beads or extrudates which have the advantage of making it easier to handle the adsorbents, for example during the steps of filling or unfilling the adsorption columns, and above all of limiting the head losses when the gas streams flow through them during their use in the process.

For agglomeration, the said actual LSX zeolite is firstly mixed with an agglomerating binder, which is in general itself in powder form, in the presence of water, and then the mixture is converted into an agglomerate, for example by extrusion or bead formation, and the zeolite/binder mixture formed is heated to a temperature of about 400-700° C. in order to convert the "green" agglomerate into a crush-resistant agglomerate. The binders used to agglomerate zeolites include clays (particularly preferred by the Applicant), silicas, aluminas, metal oxides and mixtures thereof.

It is possible to prepare agglomerates containing 5 to 10% by weight of residual binder. One process for obtaining these agglomerates with a low binder content consists in converting the binder for the agglomerates described above into a zeolitic phase. To do this, the process starts with the agglomeration of an LSX zeolite powder with a binder able to be converted into a zeolite (for example kaolin or metakaolin), and then the conversion to a zeolite takes place by alkaline maceration, for example according to the process disclosed in EP 932 581. According to the invention, remarkably effective granules containing at least 90% zeolite can thus be readily obtained.

Furthermore, the zeolites may be agglomerated with materials such as silica/alumina, silica/magnesia, silica/zirconia, silica/thoria, silica/beryllium oxide and silica/titanium dioxide, and with ternary compositions such as silica/alumina/thoria, silica/alumina/zirconia and clays present as binders.

Relative proportions of the materials constituting the binder and the zeolites may vary widely. The agglomerating binder generally represents from 5 to 30 parts by weight per 100 parts of agglomerate. Advantageously, the agglomerates have a mean diameter of about 0.2 mm to about 5 mm.

The process for purifying a syngas, that is to say a syngas based on hydrogen and containing at least nitrogen and/or at least CO, is such that each bed of absorbent undergoes the succession of treatment cycles comprising the steps consisting in:

a) making a gas mixture based on hydrogen, carbon monoxide and/or nitrogen and containing as impurities at least carbon dioxide and one or more other impurities pass through an adsorption zone comprising:

at least one adsorbent capable of selectively adsorbing carbon dioxide, which comprises at least one X zeolite of the faujasite type with an Si/Al ratio close to 1, preferably between 0.9 and 1.1 and advantageously ranging from 1 to 1.05, at least 70%, and preferably at least 90%, of the exchangeable sites of which are occupied by sodium ions, the rest of the cationic sites being occupied by K- or Ca-type cations or by other monovalent and/or polyvalent cations (magnesium, strontium, barium, lanthanides or rare earths, etc.), one or more possible other adsorbents, capable of adsorbing the impurity or possibly impurities other than $CO_2$, such as water, hydrocarbons (either light or heavy) and nitrogen oxides $N_2O$, $NO$ and $NO_2$ (usually called NOx), the adsorbents described above being either placed in successive layers and/or in the form of an intimate mixture;

b) desorbing the carbon dioxide and the other possible impurity or impurities adsorbed on the adsorbent or adsorbents described in a) by increasing the temperature and/or reducing the pressure, it being possible for this step to be supplemented with a purging phase consisting in recycling some of the purified gas; and c) increasing the pressure in the said adsorption zone by introducing a flow of purified gas via the outlet of the adsorption zone and/or cooling the adsorption zone by flushing with purified cold gas.

Thus, each bed of absorbent undergoes a treatment cycle comprising a first phase of producing a purified syngas and a second phase of regenerating the adsorbents, possibly combining decompression, heating, recompression and cooling.

The purification process according to the invention is also well suited for purifying a syngas that also contains other impurities, such as water, methane, ethane and other hydrocarbon compounds. The inventors have furthermore noted that the presence of the other compounds contained in the syngas, especially CO, makes the adsorption of carbon dioxide more difficult.

The process according to the invention is particularly suitable when the $CO_2$ concentrations of the gas mixture to be purified are not too high, that is to say:

in general, less than or equal to 1,000 ppm for adsorption pressures of around 3 MPa (which, expressed as $CO_2$ partial pressure, corresponds to values of less than or equal to 3 Pa);

preferably less than or equal to 100 ppm for adsorption pressures of around 3 MPa (which, expressed as $CO_2$ partial pressure, corresponds to values of less than or equal to 0.3 Pa).

When the syngas to be purified also contains water, it is possible to use the NaLSX-based adsorbent by itself, but it is also possible to add to the adsorption column containing the $CO_2$-selective NaLSX-based adsorbent, one or more adsorbents capable of selectively adsorbing water such as, for example, alumina, silica gel, an A-type zeolite or an X-type zeolite (with an Si/Al atomic ratio $\geq 1.25\pm0.05$); this or these water-selective adsorbents may be used as an intimate mixture with the $CO_2$-selective NaLSX-based adsorbent as disclosed in EP 862 936 or EP 904 825, or preferably in the form of a separate layer placed in the adsorption column upstream of the $CO_2$-selective adsorbent, as disclosed in EP 862 938.

When the syngas to be purified also contains heavy hydrocarbons as impurities, such as butanes, pentanes, etc., it is possible to use the NaLSX-based adsorbent by itself, but it is preferred, in the adsorption column, to add to the $CO_2$-selective NaLSX-based adsorbent one or more adsorbents capable of selectively adsorbing heavy hydrocarbons, such as for example aluminas, silica gels or active carbons, or zeolites; this or these adsorbents selective with respect to heavy hydrocarbons may be used as an intimate mixture with the $CO_2$-selective NaLSX-based adsorbent or are preferably in the form of a separate layer placed in the adsorption column upstream of the $CO_2$-selective adsorbent.

When the syngas to be purified also contains light hydrocarbons as impurities, such as ethane, ethylene, propylene, etc., and/or NOx, it is possible to use the NaLSX-based adsorbent by itself but it is preferred, in the adsorption column, to add to the $CO_2$-selective NaLSX-based adsorbent one or more adsorbents capable of selectively adsorbing light hydrocarbons and/or NOx, such as, for example, aluminas, silica gels or active carbons, or zeolites; this or these hydrocarbon-selective adsorbents may be used as an intimate mixture with the $CO_2$-selective NaLSX-based adsorbent or preferably in the form of one or more separate layers placed in the adsorption column downstream of the $CO_2$-selective adsorbent.

When the syngas to be purified contains water and/or heavy hydrocarbons and NOx and/or light hydrocarbons as impurities, it is possible to use the NaLSX-based adsorbent by itself but it is preferred, in the adsorption column, to add to the $CO_2$-selective NaLSX-based adsorbent the adsorbent(s) selective for water and/or heavy hydrocarbons either in the form of an intimate mixture as described for example in EP 1 101 521 or preferably by placing, in the form of a separate layer:

upstream of the $CO_2$-selective adsorbent, one or more adsorbents capable of selectively adsorbing water and/or heavy hydrocarbons;

and downstream of the $CO_2$-selective adsorbent, one or more adsorbents capable of selectively adsorbing light hydrocarbons and/or NOx.

Moreover, the process according to the invention may be combined with any other process for removing other impurities not mentioned above and which could also be present in the syngas: for example, if traces of mercury are contained in the syngas (coming from the hydrocarbon charge), these could be removed over a bed of silver-exchange zeolite placed in the adsorption zone of the present invention and may be desorbed during thermal regeneration. This is because it is often necessary to trap mercury vapours before the gas is introduced into a cryogenic unit so as to avoid any corrosion of the exchangers. These traces of mercury may also be removed, upstream or downstream of the unit described in this invention, over active carbons impregnated with iodine or with sulphur.

The purity of the syngas obtained as a result of the purification process according to the invention is very high: it is possible to obtain residual concentrations of $CO_2$ impurities of less than 0.1 vpm and water impurities of less than 0.1 vpm.

As a general rule, within the context of the process of the invention, the adsorption zone is maintained at a pressure of between 0.5 and 7 MPa while the gas mixture to be purified is being brought into contact with the adsorbent or adsorbents described above. However, a higher pressure would not impair the purification operation. However, for the sake of saving energy and because of the high cost of pressure-resistant installations, pressures of over 7 MPa will in general be avoided. Pressures below 0.5 MPa are not normally used for industrial syngas production for practical reasons; this is because the processes carried out upstream of the process according to the invention, which correspond to reactions for making syngas, take place at pressures generally of about 2-3 MPa. Preferably, the pressure within the adsorption zone will be maintained at a value of less than or equal to 5 MPa and advantageously less than or equal to 3 MPa. Likewise, the adsorption zone is preferably maintained at greater than or equal to 0.5 MPa and advantageously greater than or equal to 2 MPa.

The temperature of the gas stream entering the adsorption zone is not decisive and is generally kept constant during the adsorption phase. Ordinarily, this temperature is between 0 and 80° C., preferably between 20 and 50° C. The desorption temperature may be between 100 and 300° C., preferably between 150 and 250° C.

The present invention applies to any type of PSA, VSA and/or TSA process for syngas purification and thus any change of parameters, such as pressure level, rate of purge, etc., aiming to improve the performance of the process, may advantageously be combined with the abovementioned essential features of the process according to the invention.

The present invention can be applied either during the design of a new installation for syngas purification, thereby making it possible, compared with an industrial plant of the prior art operating with the same productivity, to reduce the size of the column (and hence reduce the investment cost) or, in the case of replacing the adsorbents of the columns of an existing industrial installation with the adsorbents of the present invention, an appreciable increase in productivity (or a reduction in the number of regenerations needed).

EXAMPLES

In all the examples, a gas stream of known composition was made to pass through a column filled with adsorbent(s) until $CO_2$ breakthrough, and then a desorption operation was carried out, this being repeated for several cycles.

The adsorbent column used had the following dimensions:
diameter: 2.7 cm; height: 190 cm.
A syngas having the following composition was used:
$H_2$=80 vol % (q.s.p.);
CO or $N_2$: 20 vol %;
$CO_2$: 76 vpm;
$H_2O$=2400 vpm.

$CO_2$ and $H_2O$ analysers were placed at the outlet of the column so as to monitor the change in their concentration over the cycles, and especially to detect the breakthrough of $CO_2$, which normally occurs before that of water.

The following steps were used:
1. Adsorption stage:
P=2.3 MPa;
T=38° C.;
total flow rate=6.7 $Sm^3$/h.

The first adsorption was carried out for an arbitrarily chosen time (2 to 5 h) without reaching $CO_2$ breakthrough, so as to limit the advance of the water front into the column.

Next, for the following cycles, the adsorption was continued until $CO_2$ breakthrough (up to 7 vpm), followed by automatic switching to desorption mode;
2. Desorption step (carried out countercurrently):
P=2.3 MPa;
under pure hydrogen;
$H_2$ flow rate=1.6 $Sm^3$/h/.

The temperature was gradually raised to 190° C. over 2 hours, the temperature was then maintained at 190° C. for 2 hours and then the column was cooled by a countercurrent of $H_2$ with the same flow rate (1.6 $Sm^3$/h) for 2 hours;
3. The latter step was supplemented with external cooling without hydrogen flushing in order to reach T~45° C. before resumption of the adsorption step.

Several cycles were repeated until a $CO_2$ breakthrough time stabilized.

Specimens tested were beads having a particle size of between 1.6 and 2.5 mm, consisting of 80% by weight of zeolite (active substance) and 20% of clay-based agglomerating binder.

Example 1 (Comparative)

The gas to be treated had the following composition:
$H_2$=80% by volume
$N_2$=20% by volume
$CO_2$=76 vpm
$H_2O$=2400 vpm.

The zeolite tested was NaX (degree of Na exchange≈100%; Si/Al=1.23.)

The $CO_2$ breakthrough time, which stabilized after several cycles, was 7.7 h.

Example 2 (Comparative)

The gas to be treated had the following composition:
$H_2$=80% by volume
CO=20% by volume
$CO_2$=76 vpm
$H_2O$=2400 vpm.

The zeolite tested was the same agglomerated NaX as that of Example 1.

The $CO_2$ breakthrough time which stabilized after several cycles was 4.6 h.

This example clearly illustrates the influence of the gas type on the performance of the zeolite; in this case, the presence of CO disturbs the $CO_2$ capacity of the zeolite much more than nitrogen.

Example 3 (Comparative)

The gas to be treated had the same composition as in Example 2.

The zeolite tested was a 4A zeolite (degree of Na exchange≈100%).

The $CO_2$ breakthrough time which stabilized after several cycles was 2.7 h.

Example 4 (According to the Invention)

The gas to be treated had the same composition as in Example 2.

The zeolite tested was an NaLSX (degree of Na exchange was 95.3%; Si/Al=1.0).

The $CO_2$ breakthrough time which stabilized after several cycles was 5.9 h.

Example 5 (Comparative)

Unlike Example 2, the gas to be treated was no longer wet. It had the following composition:
$H_2$=80% by volume
CO=20% by volume
$CO_2$=76 vpm.

The zeolite tested was the same agglomerated NaX zeolite as that of Example 1.

The $CO_2$ breakthrough time which stabilized after several cycles was 7.9 h.

Example 6 (Comparative)

The gas to be treated had the same composition as that in Example 5.

The zeolite tested was the same agglomerated 4A zeolite as that of Example 3.

The $CO_2$ breakthrough time which stabilized after several cycles was 3.6 h.

Example 7 (According to the Invention)

The gas to be treated had the same composition as that of Example 5.

The zeolite tested was the same agglomerated NaLSX zeolite as that of Example 4.

The $CO_2$ breakthrough time which stabilized after several cycles was 10.8 h.

It may be seen, from these last six examples, that the NaLSX zeolite gave much longer cycle times than the 4A and NaX zeolites, these being used conventionally in this kind of process, on a wet gas (Examples 2 to 4) or on a dry gas (Examples 5 to 7); the latter illustration corresponds to a process in which the zeolite is used as second layer after a first layer of adsorbent used for removing water.

For an existing installation, an NaLSX-zeolite would therefore allow less frequent regenerations, hence a substantial energy saving. For the design of a new installation, it ought to allow for reduced column dimensions and fewer amounts of adsorbents.

The invention claimed is:

1. A process for purifying syngas comprising hydrogen and at least one gas selected from the group consisting of carbon monoxide and nitrogen, contaminated with impurities comprising $H_2O$ and carbon dioxide, said process comprising the following successive steps:
    a) passing the syngas to be purified through an adsorption zone comprising:
        adsorbent capable of selectively adsorbing carbon dioxide, which comprises at least one X zeolite of the faujasite type with an Si/Al ratio of 0.9 to 1.1 (NaLSX-type zeolite), at least 70% of the exchangeable sites of which are occupied by sodium ions, the rest of the cationic sites being occupied by a monovalent or polyvalent cation,
        at least one adsorbent, capable of selectively adsorbing each of other impurities except for $CO_2$ and $H_2O$,
        at least one adsorbent capable of selectively adsorbing $H_2O$,
        the adsorbents being either intimately mixed or in the form of separate beds in successive layers; and
    b) desorbing the carbon dioxide and the other impurity or impurities adsorbed on the adsorbent or adsorbents described in a) by increasing the temperature and/or reducing the pressure, and optionally recycling some of a first purified gas.

2. A process according to claim 1 for purifying a syngas containing heavy hydrocarbons as a further impurity in addition to $CO_2$, and $H_2O$ said adsorption zone comprising adsorbent capable of adsorbing heavy hydrocarbons, either intimately mixed with the adsorbent capable of selectively adsorbing $CO_2$ or in the form of separate beds, the bed or beds of adsorbent(s) capable of selectively adsorbing the heavy hydrocarbons being placed upstream of the bed of adsorbent capable of selectively adsorbing $CO_2$.

3. A process according to claim 1 for purifying a syngas containing one or more light hydrocarbons and/or NOx as impurities in addition to $CO_2$ and water, wherein an adsorbent or adsorbents capable of adsorbing the light hydrocarbons and/or the NOx, is or are independently an alumina, a silica gel or an A-type or an X-type zeolite, are either intimately mixed with an adsorbent capable of selectively adsorbing the $CO_2$ and optionally an adsorbent or adsorbents capable of adsorbing the heavy hydrocarbons, or in the form of separate beds, the bed or beds of adsorbent(s) capable of selectively adsorbing the light hydrocarbons and/or the NOx being placed downstream of the bed of adsorbent capable of selectively adsorbing the $CO_2$.

4. A process according to claim 1 for purifying a syngas containing mercury as impurity in addition to $CO_2$ and water and optionally heavy hydrocarbons and/or light hydrocarbons and/or NOx, wherein the adsorption zone comprises a bed based on a silver-exchanged zeolite.

5. A process according to claim 1 for purifying a syngas containing mercury as impurity in addition to $CO_2$ and water and optionally heavy hydrocarbons and/or light hydrocarbons and/or NOx, further comprising an additional step comprising passing a gas stream from which mercury has to be stripped, upstream or downstream of the adsorption zone over active carbons impregnated with iodine or with sulphur.

6. A syngas purification process according to claim 1, wherein the NaLSX-type zeolite is present in agglomerated form with an agglomerating binder, the binder optionally being converted into a zeolite, representing from 5 to 30 parts by weight of the total weight of the agglomerate, the agglomerates optionally having a mean diameter ranging from about 0.2 to about 5 mm.

7. A syngas purification process according to claim 1, wherein the $CO_2$ concentration of the gas mixture to be purified is less than or equal to 1,000 ppm, for adsorption pressures of around 3 MPa, and in that the $CO_2$ partial pressure is less than or equal to 3 Pa.

8. A syngas purification process according to claim 1, comprising at least one adsorption system selected from the group consisting of the PSA, VSA and TSA.

9. A process according to claim 1, wherein said rest of the cationic sites are occupied by a cation selected from the group consisting of K, Ca, and mixtures thereof.

10. A process according to claim 1, wherein the Si/Al ratio is 1 to 1.05.

11. A process according to claim 1, wherein the Si/Al ratio is 1 to 1.

12. A process according to claim 1, wherein at least 90% of the exchangeable sites are occupied by sodium ions.

13. A process according to claim 10, wherein at least 90% of the exchangeable sites are occupied by sodium ions.

14. A syngas purification process according to claim 1, wherein the pressure of the syngas to be purified during adsorption is greater than or equal to 0.5 MPa.

15. A syngas purification process according to claim 1, wherein the pressure of the syngas to be purified during adsorption is greater than or equal to 2 MPa.

16. A syngas purification process according to claim 1, wherein the pressure of the syngas to be purified during adsorption is less than or equal to 7 MPa.

17. A syngas purification process according to claim 1, wherein the pressure of the syngas to be purified during adsorption is less than or equal to 5 MPa.

18. A syngas purification process according to claim 1, wherein the pressure of the syngas to be purified during adsorption is less than or equal to 3 MPa.

19. A syngas purification process according to claim 1, wherein the pressure of the syngas to be purified during adsorption is 2-3 MPa.

20. A syngas purification process according to claim 1, wherein the temperature of the syngas entering the adsorption zone is 0-80° C.

21. A syngas purification process according to claim 1, wherein the temperature of the syngas entering the adsorption zone is 20-50° C.

22. A syngas purification process according to claim 1, wherein the desorption temperature is 100-300° C.

23. A syngas purification process according to claim 1, wherein the temperature of the syngas entering the adsorption zone is 150-250° C.

24. A syngas purification process according to claim 1, wherein the $CO_2$ concentration of the syngas to be purified is less than or equal to 100 ppm for adsorption pressures of around 3 MPa.

25. A syngas purification process according to claim 1, wherein the $CO_2$ partial pressure in the syngas to be purified is less than or equal to 0.3 Pa.

26. A process according to claim 1, wherein the at least one adsorbent, capable of selectively adsorbing each of other impurities aside from $CO_2$ and $H_2O$, is intimately mixed with the adsorbent capable of selectively adsorbing $CO_2$.

27. A process according to claim 1, wherein the at least one adsorbent, capable of selectively adsorbing each of other impurities aside from $CO_2$ and $H_2O$, is downstream of the adsorbent capable of selectively adsorbing carbon dioxide.

28. A process according to claim 1, wherein the at least one adsorbent, capable of selectively adsorbing each of other impurities aside from $CO_2$ and $H_2O$, adsorbs hydrocarbons and nitrogen oxides.

29. A process according to claim 28, wherein the hydrocarbons are light hydrocarbons or heavy hydrocarbons and the nitrogen oxides are $N_2O$, NO and $NO_2$.

30. A process according to claim 1, further comprising increasing the pressure in the adsorption zone by introducing a flow of a purified gas via the outlet of the adsorption zone and/or cooling the adsorption zone by flushing with at least some of a cold second purified gas.

31. A process according to claim 1, wherein the adsorption zone comprises an upstream bed of said adsorbent capable of selectively adsorbing $H_2O$ and a downstream bed of said adsorbent capable of selectively adsorbing carbon dioxide.

32. A process according to claim 1, wherein the syngas comprises hydrogen and carbon monoxide.

33. A process according to claim 1, wherein the syngas comprises hydrogen and nitrogen.

34. A process for purifying syngas comprising hydrogen and at least one gas selected from the group consisting of carbon monoxide and nitrogen, contaminated with impurities comprising carbon dioxide, comprising the following successive steps:

a) passing the syngas to be purified through an adsorption zone comprising:

adsorbent capable of selectively adsorbing carbon dioxide, which comprises at least one X zeolite of the faujasite type with an Si/Al ratio of 0.9 to 1.1 (NaLSX-type zeolite), at least 70% of the exchangeable sites of which are occupied by sodium ions, the rest of the cationic sites being occupied by a monovalent or polyvalent cation, at least one adsorbent, capable of selectively adsorbing each of other impurities aside from $CO_2$ and water, the at least one adsorbent being either intimately mixed or in the form of separate beds in successive layers;

b) desorbing the carbon dioxide and the other impurity or impurities adsorbed on the adsorbent or adsorbents described in a) by increasing the temperature and/or reducing the pressure, and optionally recycling some of a first purified gas; and c) increasing the pressure in the adsorption zone by introducing a flow of a purified gas via the outlet of the adsorption zone and/or cooling the adsorption zone by flushing with at least some of a cold second purified gas.

35. A process according to claim 34 for purifying a syngas containing at least one of water and heavy hydrocarbons as impurities in addition to $CO_2$, said adsorption zone comprising adsorbent capable of adsorbing heavy hydrocarbons, either intimately mixed with the adsorbent capable of selectively adsorbing $CO_2$ or in the form of separate beds, the bed or beds of adsorbent(s) capable of selectively adsorbing the heavy hydrocarbons being placed upstream of the bed of adsorbent capable of selectively adsorbing $CO_2$.

36. A process according to claim 34 for purifying a syngas containing one or more light hydrocarbons and/or NOx as impurities in addition to $CO_2$ and optionally water and/or heavy hydrocarbons, wherein an adsorbent or adsorbents capable of adsorbing the light hydrocarbons and/or the NOx, is or are independently an alumina, a silica gel or an A-type or an X-type zeolite, are either intimately mixed with the adsorbent capable of selectively adsorbing the $CO_2$ and optionally an adsorbent or adsorbents capable of adsorbing the heavy hydrocarbons, or in the form of separate beds, the bed or beds of adsorbent(s) capable of selectively adsorbing the light hydrocarbons and/or the NOx being placed downstream of the bed of adsorbent capable of selectively adsorbing the $CO_2$.

37. A process according to claim 34 for purifying a syngas containing mercury as impurity in addition to $CO_2$ and optionally in addition to water and/or heavy hydrocarbons, light hydrocarbons and/or NOx, wherein the adsorption zone comprises a bed based on a silver-exchanged zeolite.

38. A process according to claim 34 for purifying a syngas containing mercury as impurity in addition to $CO_2$ and optionally water and/or heavy hydrocarbons, light hydrocarbons and/or NOx, further comprising an additional step comprising passing a gas stream from which mercury has to be stripped, upstream or downstream of the adsorption zone over active carbons impregnated with iodine or with sulphur.

39. A syngas purification process according to claim 34, wherein the NaLSX-type zeolite is present in agglomerated form with an agglomerating binder, the binder optionally being converted into a zeolite, representing from 5 to 30 parts by weight of the total weight of the agglomerate, the agglomerates optionally having a mean diameter ranging from about 0.2 to about 5 mm.

40. A syngas purification process according to claim 34, wherein the $CO_2$ concentration of the gas mixture to be purified is less than or equal to 1,000 ppm, for adsorption pressures of around 3 MPa, and in that the $CO_2$ partial pressure is less than or equal to 3 Pa.

41. A syngas purification process according to claim 34, comprising at least one adsorption system selected from the group consisting of the PSA, VSA and TSA.

42. A process according to claim 34, wherein said rest of the cationic sites are occupied by a cation selected from the group consisting of K, Ca, and mixtures thereof.

43. A process according to claim 34, wherein the Si/Al ratio is 1 to 1.05.

44. A process according to claim 34, wherein the Si/Al ratio is 1 to 1.

45. A process according to claim 34, wherein at least 90% of the exchangeable sites are occupied by sodium ions.

46. A process according to claim 43, wherein at least 90% of the exchangeable sites are occupied by sodium ions.

47. A syngas purification process according to claim 34, wherein the pressure of the gas mixture to be purified during adsorption is greater than or equal to 0.5 MPa.

48. A syngas purification process according to claim 34, wherein the pressure of the gas mixture to be purified during adsorption is greater than or equal to 2 MPa.

49. A syngas purification process according to claim 34, wherein the pressure of the gas mixture to be purified during adsorption is less than or equal to 7 MPa.

50. A syngas purification process according to claim 34, wherein the pressure of the gas mixture to be purified during adsorption is 0.5-7 MPa.

51. A syngas purification process according to claim 34, wherein the pressure of the gas mixture to be purified during adsorption is less than or equal to 5 MPa.

52. A syngas purification process according to claim 34, wherein the pressure of the gas mixture to be purified during adsorption is less than or equal to 3 MPa.

53. A syngas purification process according to claim 34, wherein the pressure of the gas mixture to be purified during adsorption is 2-3 MPa.

54. A syngas purification process according to claim 34, wherein the temperature of the gas stream entering the adsorption zone is 0-80° C.

55. A syngas purification process according to claim 34, wherein the temperature of the gas stream entering the adsorption zone is 20-50° C.

56. A syngas purification process according to claim 34, wherein the desorption temperature is 100-300° C.

57. A syngas purification process according to claim 34, wherein the desorption temperature is 150-250° C.

58. A syngas purification process according to claim 34, wherein the $CO_2$ concentration of the gas mixture to be purified is less than or equal to 100 ppm for adsorption pressures of around 3 MPa.

59. A syngas purification process according to claim 34, wherein the $CO_2$ partial pressure is less than or equal to 0.3 Pa.

60. A process according to claim 34, wherein the at least one adsorbent, capable of selectively adsorbing each of other impurities aside from $CO_2$ and water, is intimately mixed with the adsorbent capable of selectively adsorbing $CO_2$.

61. A process according to claim 34, wherein the at least one adsorbent, capable of selectively adsorbing each of other impurities aside from $CO_2$ and water, is downstream of the adsorbent capable of selectively adsorbing carbon dioxide.

62. A process according to claim 34, wherein the at least one adsorbent, capable of selectively adsorbing each of other impurities aside from $CO_2$ and water, adsorbs hydrocarbons and nitrogen oxides.

63. A process according to claim 62, wherein the hydrocarbons are light hydrocarbons or heavy hydrocarbons and the nitrogen oxides are $N_2O$, NO and $NO_2$.

* * * * *